United States Patent Office 3,173,949
Patented Mar. 16, 1965

3,173,949
RECOVERY OF GLUTAMIC ACID FROM A FERMENTATION BROTH USING CATION EXCHANGE RESINS
Masatami Tanaka and Yoshiatsu Aoki, Maebashi-shi, Japan, assignors to Shinshin Food Industrial Co., Ltd., Tokyo, Japan, a corporation of Japan
No Drawing. Filed May 29, 1961, Ser. No. 113,078
Claims priority, application Japan, May 30, 1960, 35/25,669
2 Claims. (Cl. 260—527)

In order to produce glutamic acid from a fermentation broth cultured by inoculating glutamic-acid-producing bacteria to a culture liquid prepared by adding nitrogen sources to proteinous substances or sugar substances, there has been conventionally adopted a method of recovering glutamic acid by a desorption agent after adsorbing substantially all the glutamic acid on a strong acidic ion-exchange resin. Alternatively, a method employed involves performing adsorption and desorption separately. However, the fermentation broth of glutamic acid is admixed with a large quantity of contaminating ions, such as ammonium ion added during the culture, and unutilized ammonium ion produced by decomposition of urea or metallic ion added as a required nutriment source. This not only substantially decreases the exchange ability of the ion-exchange resin but also adversely influences the crystalline yield ratio by lowering the purity of glutamic acid due to the mixing of a large quantity of cations in the resultant solution of glutamic acid.

This invention relates to a method for treating a glutamic acid fermentation broth as set out above characterized by first, eliminating the contaminating ions with weak acidic ion exchange resin having a high capability of exchange and which does not adsorb glutamic acid, and second, flowing off anions as well as non-electrolyte impurities with strong acidic ion exchange resin when treating the fermentation broth of glutamic acid or other liquids containing glutamic acid, for the purpose of removing the defects above mentioned.

Thus, in this invention, substantially all the strong acidic cations are adsorbed and eliminated by using weak acidic ion exchange resin having a large cation exchange volume in the first stage of the inventive process. Then the resultant liquid, having high purity of glutamic acid, is contacted with a strong acidic ion-exchange resin whereby glutamic acid as well as a minimal quantity of cations are adsorbed and all anions are flowed off. Succeedingly, a liquid having high concentration and purity of glutamic acid is recovered chromatographically by using caustic soda as a desorption agent, and the liquid is then allowed to stand for cooling to obtain crystalline glutamic acid having high purity.

A principle of this invention is based on the facts that glutamic acid is an amphoteric electrolyte and has a property of acting either as anion or as cation according to the conditions, and that weakly acidic ion exchangers, for instance, carbonic acid exchangers, selectively adsorb cations under certain conditions, and, moreover, have an extremely large capacity for exchanging or adsorbing strong cations under alkaline state, namely, as much as about 180% of strong acidic ion-exchange resin may be exchanged and adsorbed.

In employing the method of this invention to the fermentation broth, cations in the fermentation broth, such as ammonium ion, metallic ion, basic amino acidic ion and the like are adsorbed by introducing alkaline after-fermentation broth having a pH of about 8, obtained by removal of bacterial body or heated, through weak acidic ion exchange resin. For example, Amberlite IRC-50, Duolite CS-101 and the like, may be used, which are previously regenerated to H-form.

When the pH drops below 7, adsorption ability decreases, as weak acidic ion does not decompose neutral salt in general. However, since the glutamic acid in the broth is an amphoteric electrolyte and is present as weak anion, adsorption ability is not decreased until the pH attains an isoelectric point of glutamic acid, which means that almost all cations corresponding to glutamic acid as anions can be adsorbed and removed. An effluent from the weak acidic resin column is then fed through strong acidic ion-exchange resin such as Amberlite IR-120, Duolite C-3, Diaion 5K-1 etc., which has been previously regenerated to H-form, to carry out adsorption of glutamic acid. Although glutamic acid acts as a weak cation in strong acidic ion-exchange resin, it is adsorbed to a fixed layer in the resin column, apart from strong cation, a small amount of which has been mingled in the first stage.

In addition, as this adsorption layer is situated at the lowest part of the resin column, it is pushed out comparatively simply by pouring a small amount of a desorption agent from upper part of the column and is desorbed separately from other cations. The desorption liquid comes out as glutamic acid solution having a pH around 3.2 which is almost the isoelectric point. Also this liquid contains 3 to 5 times the glutamic acid concentration as the initial feed material and at the same time, not only are contaminating ions removed but also substances which interfere with crystallization of glutamic acid such as proteinous substances, high polymer coloring matter compounds, remained sugar after-fermentation, polymerization products of carbohydrates etc., are flowed off when the liquid is fed through the strong acidic resin column. Therefore, the final effluent is so pure a glutamic acid solution that it is possible to obtain crystalline glutamic acid having high purity in favorable yield by merely allowing the solution to stand for cooling or by forcible cooling.

The following Table 1 shows a balance list of substances when strong acidic ion-exchange resin is used alone and according to this invention.

TABLE 1

Balance list of main components

|  |  | NH$_4^+$ | Na$^+$ | Glu. | SO$_4^{--}$ | Cl$^-$ | Sug. |
|---|---|---|---|---|---|---|---|
|  | Fermentation broth | 410 | 1 | 300 | 1.8 | 1 | 25 |
| This invention. | Regenerated hydrochloric acid. |  |  |  |  | 450 |  |
|  | Desorbed caustic material. |  | 415 |  |  |  |  |
|  | Effluent in 1st stage. | 38 | 10 | 300 | 1.8 | 6.5 | 25 |
|  | Effluent in 2nd stage. | 0 | 0 | 0 | 1.8 | 5.5 | 25 |
|  | Desorption liquid. | 19 | 24 | 298 | 0 | 39 | 0 |
| Strong acidic ion-exchange resin used alone. | Regenerated hydrochloric acid. |  |  |  |  | 1090 |  |
|  | Desorbed caustic material. |  | 850 |  |  |  |  |
|  | Effluent | 0 | 0.9 | 0 | 1.8 | 9.8 | 23 |
|  | Desorption liquid. | 130 | 89 | 269 | 0 | 65 | 2 |

Each unit indicates mole.
Glu.: glutamic acid. Sug.: remained sugar (as grape sugar).

As is clear from the above table, when this invention was applied, it became possible to decrease the amount of regenerated mineral acid used and alkali used for desorption to ⅓, compared with the conventional method of using strong acidic resin alone. Further, it made possible a remarkably higher purity glutamic acid, formed by a comparatively simple method as well as an increase in the crystalline yield ratio. In order to aid in the understanding of the present invention, the following example is given for illustration but not for limitation. In the example, "gr./dl." means "grams per deciliter of solvent," and "S.V." means "space velocity" in units "vol. of liquid/hr./vol. of resin."

EXAMPLE 1

A liquid of glutamic acid containing 4.2 gr./dl. of glutamic acid having a pH of 8.2 was heated to 60° C. After filtration from bacterial fermentation medium, this was press-introduced from upper part of a standing resin column filled with 200 l. of weak acidic ion-exchange resin or Amberlite IRC–50, which is previously regenerated to H-form. The feed of the liquid (S.V. 6–7) was stopped just before the pH increased rapidly to around 5 from the initial pH of around 3. At the same time, this effluent was successively fed at S.V. 3–4 to upper part of a standing resin column filled with 400 l. of strong acidic ion-exchange resin or Amberlite IR–120, which is previously regenerated to H-form. The feeding was stopped when pH started to increase slightly from initial pH of around 2.0, then was washed with water, was eluted at S.V. 4 with 400 l. of warm solution of 4% caustic soda and initial 100 l. fraction was collected. Nextly 300 l. of effluent and the wash was recovered for the later operation. As the pH of the eluate was around 3.0, a small amount of caustic soda was added to adjust at 3.2 and the eluent was cooled by standing. By one operation through this apparatus, 400 l. of fermentation broth was treated to obtain 100 l. of concentrated desorption liquid. The concentration of glutamic acid was 16.6 gr./dl. This liquid was allowed to stand for cooling for 14 hours, then forcibly cooled to 5° C. and crystallized. This was dried after filtration by centrifugation to obtain 15.7 kg. of 98% crude crystalline glutamic acid. The mother liquor was further concentrated to obtain 0.5 kg. of 96% crude crystalline glutamic acid. The yield ratio was 95.5%.

What we claim is:
1. Method for recovering glutamic acid from a glutamic acid-containing fermentation broth, which comprises
   (1) charging at a space velocity of 3 to 6 glutamic acid-containing fermentation broth having a pH of about 8 at a temperature of 30° to 50° C. into a column containing carboxylic acid-type weakly acidic cation exchange resin of H-form while maintaining the effluent pH between 2 and 6 whereby cationic impurities in said liquid are removed,
   (2) charging at a space velocity of 1.5 to 3 the resultant effluent into a second column containing sulfonic acid-type strongly acidic cation exchange resin of H-form whereby glutamic acid and residual cations are substantially completely adsorbed while anionic impurities and non-electrolytic impurities are flowed out,
   (3) eluting the resultant adsorbed cations from (2) with 1.5 to 2.0 N sodium hydroxide solution at a space velocity of 1.5 to 3.0 and at a temperature of 30° to 50° C., and
   (4) separating glutamic acid by crystallization.
2. Method according to claim 1, wherein the eluate fraction of (4) is adjusted to a pH of 5.0 to 6.0, concentrated to ¼ to ⅙ of its volume, and the resulting concentrate is readjusted to a pH of about 3.2 and cooled to thereby precipitate crystals of glutamic acid.

References Cited by the Examiner
UNITED STATES PATENTS

| | | | |
|---|---|---|---|
| 1,973,574 | 9/34 | Marshall | 260—527 |
| 2,738,353 | 3/56 | Blish | 260—527 |
| 3,015,655 | 1/62 | Stark | 260—534 |

OTHER REFERENCES

Englis et al.: Ind. Eng. Chem., 36, 604–609 (1944).
Rohm & Haas: The Resinous Reporter, vol. IX, No. 4 (1948).
Winters et al.: Ind. Eng. Chem., 41, 460–463 (1949).

LORRAINE A. WEINBERGER, *Acting Primary Examiner.*

CHARLES B. PARKER, LEON ZITVER, JOSEPH R. LIBERMAN, *Examiners.*